(12) United States Patent
Terada (10) Patent No.: US 7,912,346 B2
(45) Date of Patent: Mar. 22, 2011

(54) IMAGE INFORMATION RECORDING MEDIUM, IMAGE INFORMATION PROCESSOR, AND IMAGE INFORMATION PROCESSING PROGRAM

(75) Inventor: Masahiro Terada, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1186 days.

(21) Appl. No.: 10/269,939

(22) Filed: Oct. 15, 2002

(65) Prior Publication Data

US 2003/0072561 A1    Apr. 17, 2003

(30) Foreign Application Priority Data

Oct. 16, 2001 (JP) ................ P.2001-318124

(51) Int. Cl.
*H04N 5/91* (2006.01)
*H04N 9/80* (2006.01)

(52) U.S. Cl. ............ 386/241; 386/248; 386/95; 386/96; 386/125; 386/126

(58) Field of Classification Search ............ 386/46, 386/52, 95, 121, 125–126, 82, 120, 96, 45; 348/461
See application file for complete search history.

(56) References Cited

U.S. PATENT DOCUMENTS

| | | | | | |
|---|---|---|---|---|---|
| 6,072,479 | A | * | 6/2000 | Ogawa | 707/104.1 |
| 6,078,005 | A | * | 6/2000 | Kurakake et al. | 84/477 R |
| 6,137,954 | A | * | 10/2000 | Sawabe et al. | 386/95 |
| 6,317,141 | B1 | * | 11/2001 | Pavley et al. | 715/732 |
| 6,389,222 | B1 | * | 5/2002 | Ando et al. | 386/95 |
| 6,714,216 | B2 | * | 3/2004 | Abe | 715/723 |
| 6,839,500 | B2 | * | 1/2005 | Bae | 386/68 |
| 6,839,502 | B2 | * | 1/2005 | Nakatani et al. | 386/82 |
| 7,158,175 | B2 | * | 1/2007 | Belz et al. | 348/231.3 |
| 2002/0049731 | A1 | * | 4/2002 | Kotani | 707/1 |
| 2002/0118949 | A1 | * | 8/2002 | Jones et al. | 386/68 |
| 2002/0180803 | A1 | * | 12/2002 | Kaplan et al. | 345/810 |

FOREIGN PATENT DOCUMENTS

| | | |
|---|---|---|
| JP | 11-225307 A | 8/1999 |
| JP | 11-331656 A | 11/1999 |
| JP | 2000-032378 A | 1/2000 |
| JP | 2000-335023 A | 12/2000 |
| JP | 2001-223980 A | 8/2001 |
| JP | 2004-531119 A | 10/2004 |

* cited by examiner

*Primary Examiner* — Jamie Atala
(74) *Attorney, Agent, or Firm* — Sughrue Mion, PLLC (57) ABSTRACT

This invention provides a DVD-ROM includes an image information area for DVD-Video playback apparatus and an image information area for computer processing. A CD-ROM includes an image information area for Video-CD playback apparatus and an image information area for computer processing. In the image information area for DVD-Video playback apparatus is written digital image information which can be played back on DVD-Video playback apparatus. In the image information area for Video-CD playback apparatus is written digital image information which can be played back Video-CD playback apparatus. In the image information areas for computer processing is written in the DCF standards digital image information having a data format supporting recording, playback and printing on a computer such as a personal computer.

33 Claims, 6 Drawing Sheets

IMAGE INFORMATION RECORDING MEDIUM, IMAGE INFORMATION PROCESSOR, AND IMAGE INFORMATION PROCESSING PROGRAM

BACKGROUND OF THE INVENTION

1. Field of the Invention

The present invention relates to an image information recording medium, an image information processor, and an image information processing program, and in particular to an image information recording medium, an image information processor, and an image information processing program for creating image information readable by image playback apparatus of the DVD-Video or Video-CD system from image information shot by a digital camera and recorded by a recording medium readable by a computer, as well as recording the former image information and the latter image information.

2. Description of the Related Art

In recent years, a recording medium attached to a digital camera for recording an image (still image) shot by the digital camera as digital image information records the digital image information in a recording format readable from a computer.

Use of the recorded digital image information generally includes starting up a computer such as a personal computer where a viewing software program conforming to the recording format is installed in advance and letting the computer read, record, play back and print the digital image information. Alternatively, the digital image information may be printed by a photo processing shop.

In recent years, improvement in the image quality obtained when an image is recorded/stored, played back, or printed on a computer such as a personal computer or improvement in the printed image quality obtained when an image is printed by a photo processing shop has become a key performance index of a digital camera. Thus, the number of pixels (information volume) of digital image information recorded in a recording medium (a recording medium attached to a digital camera) tends to increase considerably.

Means for viewing a digital image which has been shot includes an additional feature in a digital camera main unit for monitoring such an image by way of a television receiver, as well as the aforementioned method of using a computer.

A related art recording medium attached to a digital camera requires startup of a computer where a viewing software program corresponding to the standards of the recording medium has been installed before the recording medium can be used (recorded on a storage recording medium, played back or printed), as mentioned earlier.

When printing of specific images is requested of a print processing shop, a computer where a viewing software program conforming to the standards for the recording medium has been installed must be started to sequentially view the shot images and viewing must be paused when a desired image is displayed, the corresponding frame number must be jotted down and presented to the print processing shop.

Such startup of a computer needs workload and is cumbersome. A computer such as a personal computer is required as a facility and a viewing software program conforming to the standards for the recording medium must be installed in advance in the computer. Installation of the viewing software program conforming to the standards of the recording medium is required each time the standards for the recording medium undergo revision. This is quite cumbersome and is a heavy load on the available disk capacity of the computer.

For a digital camera incorporating an additional feature to monitor shot digital images by way of a television receiver, connection to a television set is quite cumbersome and television set cannot be used as a television set proper.

SUMMARY OF THE INVENTION

The invention has been proposed in view of the aforementioned circumstances and aims at providing an image information recording medium for recording still image information for computer processing and recording the still image information so as to be viewed on image playback apparatus of the DVD-Video or Video-CD system, as well as an image information processor and an image information processing program for enabling such recording.

An image information recording medium according to the first aspect of the invention is an image information recording medium for recording image information, characterized in that the image information recording medium comprises a first image information area for recording still image information dedicated to computer processing and a second image information area for recording moving picture information dedicated to digital video apparatus by using the still image information as an information source. An image information processor according to the ninth aspect of the invention is an image information processor for converting still image information dedicated to computer processing to image information for a plurality of pieces of digital apparatus conforming to different standards to record the resulting image information onto the same image information recording medium, characterized in that the image information processor comprises first recording means for recording still image information dedicated to computer processing in the first image information area and second recording means for recording moving picture information dedicated to digital video apparatus in the second image information area by using the still image information as an information source. An image information processing program according to the seventeenth aspect of the invention is an image information processing program for converting still image information dedicated to computer processing to image information for a plurality of pieces of digital apparatus conforming to different standards to record the resulting image information onto the same image information recording medium, characterized in that the image information processing program causes a computer to serve as first recording means for recording still image information dedicated to computer processing in the first image information area and second recording means for recording moving picture information dedicated to digital video apparatus in the second image information area by using the still image information as an information source.

According to the invention, it is possible to record still image information with a number of pixels for computer processing as well as view the still image information on image playback apparatus of the DVD-Video or Video-CD system, so that it is possible to provide, on a single recording medium, original image information with full information volume and image information with reduced information volume which can be played back on more general-purpose playback apparatus.

In the second image information area, slide-show-type moving picture data comprising a required number of copies of single-frame still image data may be recorded per frame of still image data recorded in the first image information area (second, tenth and eighteenth aspects of the invention). In the second image information area, image information for video apparatus of the DVD-Video system may be recorded (third, eleventh and nineteenth aspects of the invention). In the second image information area, text data created using a subtitling feature may be recorded as well as slide-show-type moving picture data (fourth, twelfth and twentieth aspects of the invention). Further, in the second image information area, image data created using a multi-angle feature may be recorded as well as the slide-show-type moving picture data (fifth, thirteenth and twenty-first aspects of the invention). In the second image information area, image information for video apparatus of the Video-CD system may be recorded (sixth, fourteenth and twenty-second aspects of the invention). Text data may be written over the slide-show-type moving picture data recorded in the second image information area (seventh, fifteenth and twenty-third aspects of the invention). Further, the text data may be information (frame numbers) indicating correspondence to still image data recorded in the first image information area (eighth, sixteenth and twenty-fourth aspects of the invention). By adding such information, the user who can view only slide-show-type moving picture data recorded in the second image information area can identify still image data recorded in the first image information area without computer processing. As a result, it is possible to order prints by using still image data with greater information volume recorded in the first image information area.

In the figures, the reference numeral 1 refers to a DVD-ROM; 2 to a CD-ROM; 11 to an image information area for DVD-Video playback apparatus; 12 and 22 to image information areas for computer processing; 21 to an image information area for Video-CD playback apparatus; 51 to an input apparatus; 52 to a keyboard interface; 53 to a controller; 54 to storage section; 55 to a readout/recording apparatus; 56 to a data converter; 57 to a file converter; 58 to a recording apparatus; 5A to a digital camera storage medium; 5B to an edited digital camera recording medium; 5C to a blank recording medium; 5D to an edited recording medium; 111 to a directory area for DVD-Video; 112 to an image data area for DVD-Video; 121 and 221 to directory areas for CPU; 122 to an image data area for CPU; 211 to a directory area for Video-CD; 212 to an image data area for Video-CD; and 222 to an image data area for CPU.

DETAILED DESCRIPTION OF THE PREFERRED EMBODIMENTS

Embodiments of the invention will be described referring to the drawings.

First Embodiment

Figure 1A:
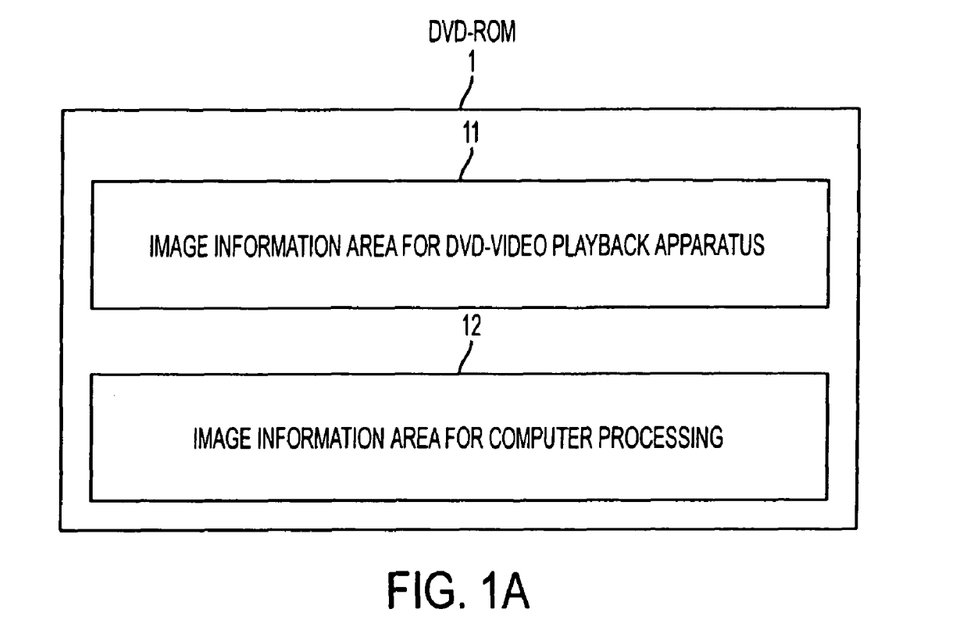
FIGS. 1A and 1B are data maps showing the data structure of an image information recording medium according to the first embodiment of the invention.
Figure 1B:
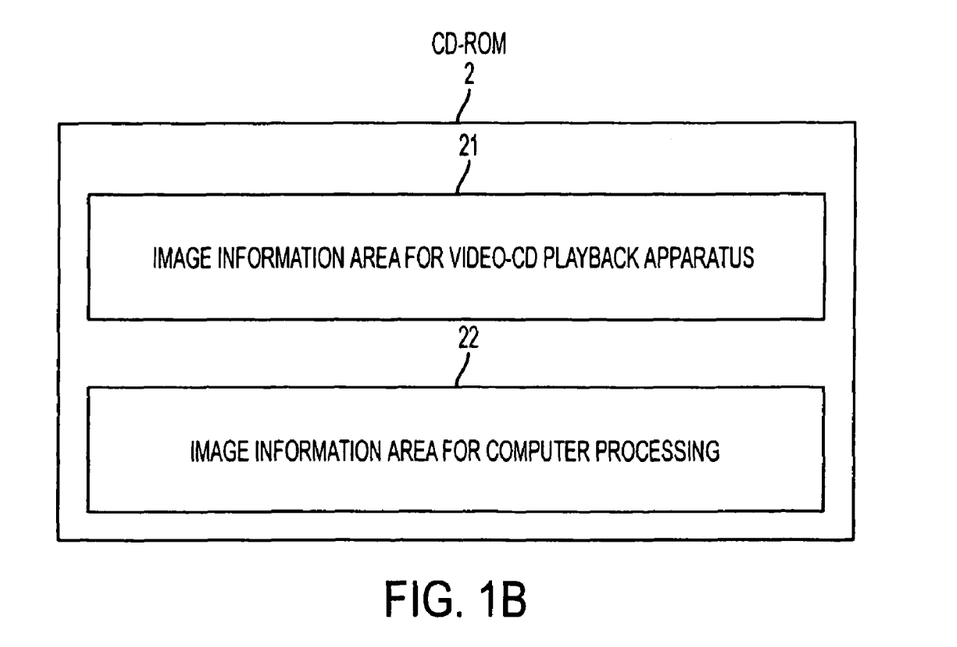

FIGS. 1A and 1B are data maps showing the data structure of an image information recording medium according to the first embodiment of the invention. FIG. 1A shows an image information recording medium of the DVD system. FIG. 1B shows an image information recording medium of the CD system.

Data structure of the image information recording medium according to this embodiment comprises an image information area 11 for DVD-Video playback apparatus in DVD-ROM (1), for an image information recording medium of the DVD system shown in FIG. 1A. Data structure of the image information recording medium according to this embodiment comprises an image information area 21 for Video-CD playback apparatus in CD-ROM (2), for an image information recording medium of the CD system shown in FIG. 1B.

In the image information area 11 for DVD-Video playback apparatus is written digital image information having a data format supporting playback on DVD-Video playback apparatus. In the image information area 21 for Video-CD playback apparatus is written digital image information having a data format supporting playback on Video-CD playback apparatus. In the image information areas 12, 22 for computer processing is written digital image information having a data format respectively supporting recording, playback and printing on a computer such as a personal computer.

The image information areas 12, 22 for computer processing records digital image information in accordance with the DCF (Design Rule for Camera File System) as digital camera file standards. By using frame numbers confirming to the DCF standards to identify digital image information for printing, it is possible to identify image information used when printing is requested externally.

Figure 2A:
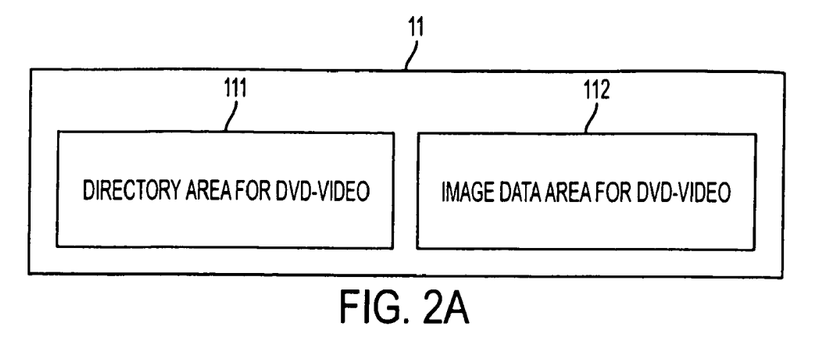
FIGS. 2A, 2B, 2C, and 2D are data maps showing the data structure of an image information area of an image information recording medium according to the first embodiment of the invention.
Figure 2B:
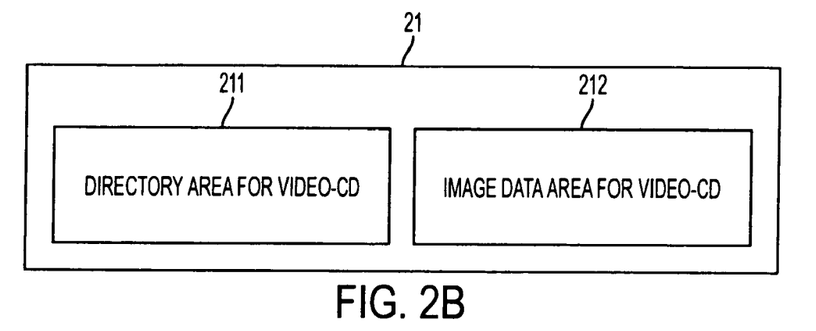
Figure 2C:
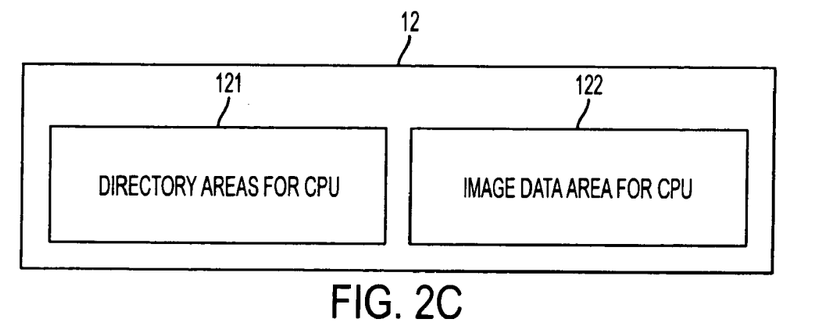
Figure 2D:
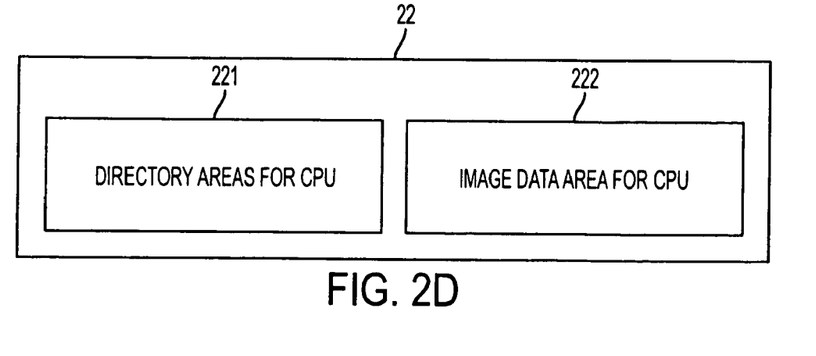

FIGS. 2A, 2B, 2C, and 2D are data maps showing the data structures of an image information area of an image information recording medium according to the first embodiment of the invention. FIG. 2A shows the data structure of an image information area 11 for DVD-Video playback apparatus. FIG. 2B shows the data structure of an image information area 21 for Video-CD playback apparatus. FIG. 2C shows the data structure of an image information area 12 for computer processing. FIG. 2D shows the data structure of an image information area 22 for computer processing.

In FIG. 2A, the data structure of the image information area 11 for DVD-Video playback apparatus comprises a directory area 111 for DVD-Video and an image data area 112 for DVD-Video. In FIG. 2B, the data structure of the image information area 21 for Video-CD playback apparatus comprises a directory area 211 for Video-CD and an image data area 212 for Video-CD. In FIG. 2C, the data structure of an image information area 12 for computer processing comprises a directory area 121 for CPU and an image data area 122 for CPU. In FIG. 2D, the data structure of an image information area 22 for computer processing comprises a directory area 221 for CPU and an image data area 222 for CPU.

In the directory area 111 for DVD-Video is written for example file information mentioned later referring to FIG. 3A. In the image data area 112 for DVD-Video is written digital image data (still image group) comprising a data format supporting playback on DVD-Video playback apparatus. In the directory area 211 for Video-CD is written for example file information mentioned later referring to FIG. 3B. In the image data area 212 for Video-CD is written digital image data (still image group) comprising a data format supporting playback on Video-CD playback apparatus. In the directory area 121 for CPU is written for example file information mentioned later referring to FIG. 3C. In the image data area 122 for CPU is written digital image data (still image group) comprising a data format supporting recording, playback and printing on a computer comprising DVD-Video playback apparatus. In the directory area 221 for CPU is written for example file information mentioned later referring to FIG. 3C. In the image data area 222 for CPU is written digital image data (still image group) comprising a data format supporting recording, playback and printing on a computer comprising Video-CD playback apparatus.

Figure 3A:
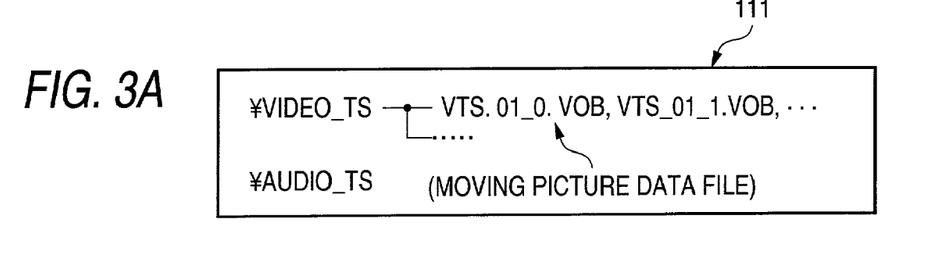
FIGS. 3A, 3B, and 3C are explanatory drawings to show examples of information in the directory area included in the image information area of an image information recording medium according to the first embodiment of the invention.
Figure 3B:
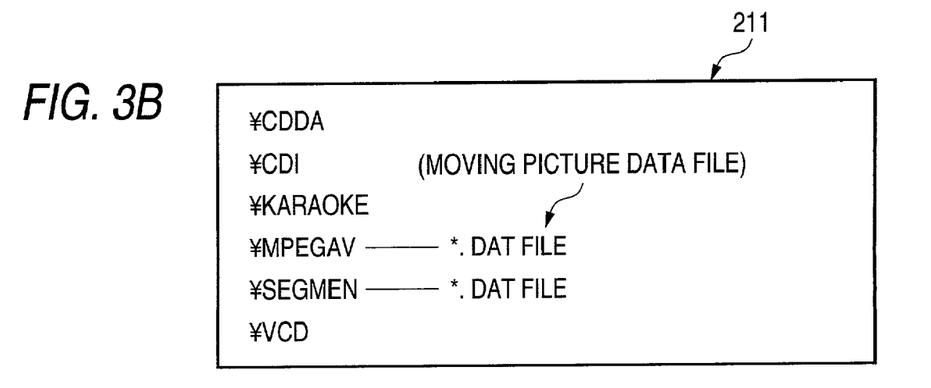
Figure 3C:
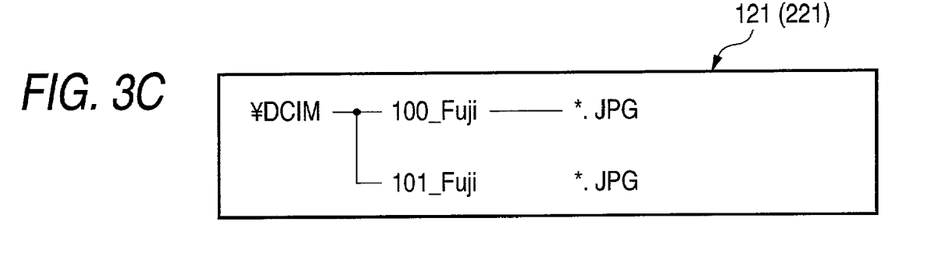

FIGS. 3A, 3B, and 3C are explanatory drawings to show examples of information in the directory area included in the image information area of an image information recording medium according to the first embodiment of the invention. FIG. 3A shows an example of information included in the directory area 111 for DVD. FIG. 3B shows an example of information included in the directory area 211 for CD. FIG. 3C shows an example of information included in the directory areas 121, 221 for CPU. In each of these directory areas, it is possible to write information such as a file name assigned to data written in respective data area, location information necessary for accessing the data, a data compression system for the data, a coding system including error correction codes, and a encryption key necessary for encoding.

Figure 4A:
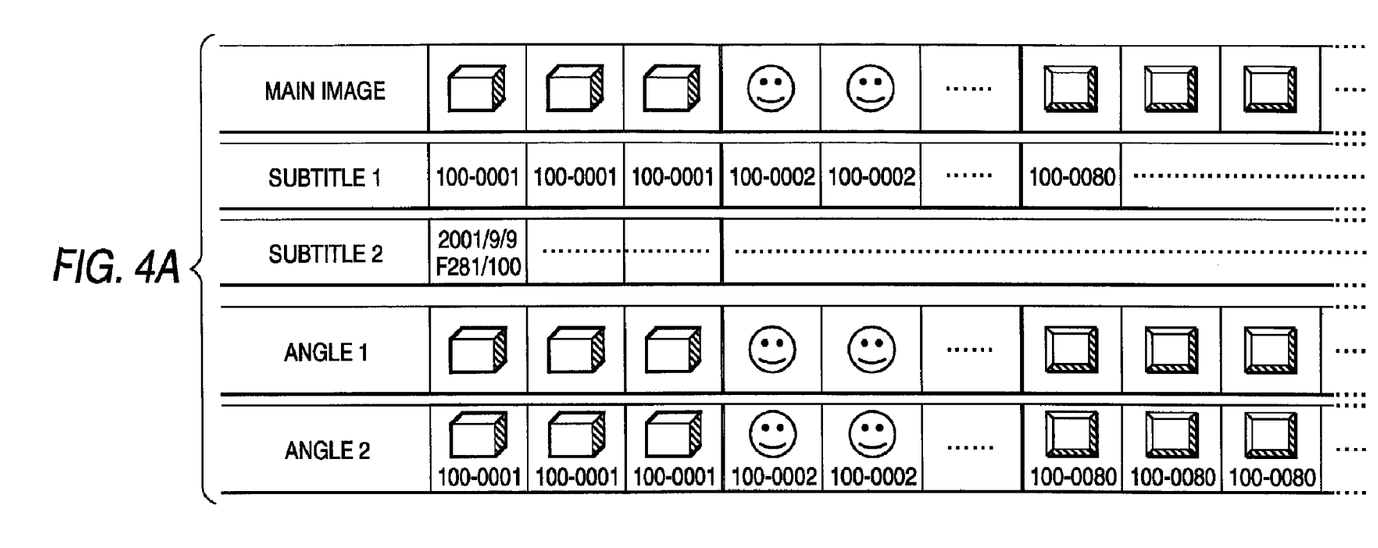
FIGS. 4A and 4B are explanatory drawings to show examples of data written into the image data area of an image information recording medium according to the first embodiment of the invention.
Figure 4B:
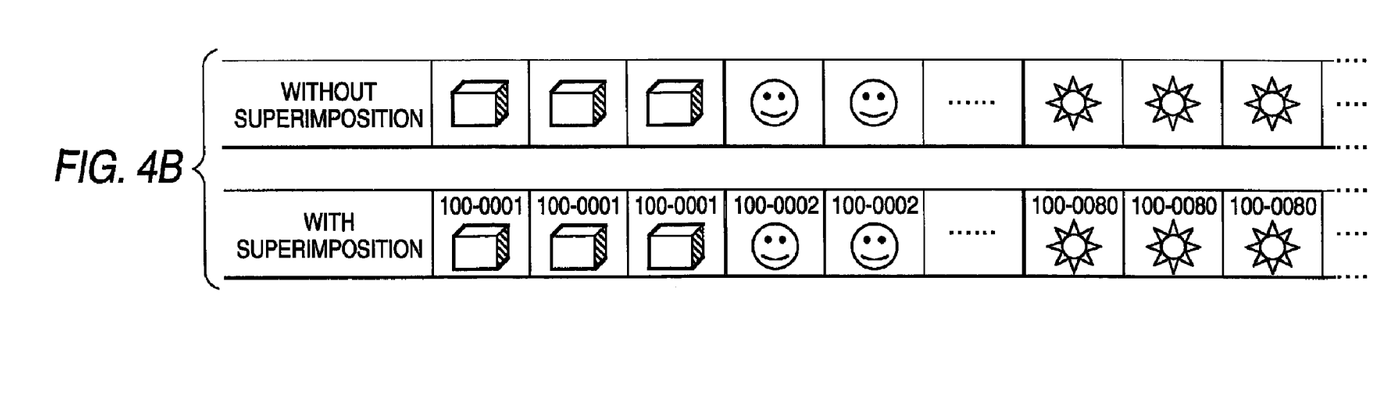

FIGS. 4A and 4B are explanatory drawings to show examples of data written into the image data area of an image information recording medium according to the first embodiment of the invention. FIG. 4A shows an example of data written into the image data area 112 for DVD. FIG. 4B shows an example of data written into the image data area 212 for CD.

In the image data area 112 for DVD-Video are recorded repetitive images of an image obtained by resizing a still image to the DVD-Video format in each frame of the still image written in the image data area 122 for CPU. The number of repetitive recordings is determined to allow playback of each still image as a moving picture (slide-show-type moving picture) for five seconds.

In recording in the image data area 112 for DVD, it is possible to use an area for a subtitle stream of DVD, that is, text information such as frame numbers and shooting date can be recorded. Also, an area for multi-angle data can be used, that is, an image with subtitle superimposed can be recorded as a separate angle stream. By using these features, frame numbers corresponding to original still images can be played back with arbitrary timing.

In the image data area 212 for CD are recorded repetitive images of an image obtained by resizing a still image to the Video-CD format in each frame of the still image written in the image data area 222 for CPU. The number of repetitive recordings is determined to allow playback of each still image as a moving picture (slide-show-type moving picture) for five seconds. It is possible to superimpose the frame number of the original still image in each frame of these repetitive images. This allows a frame number corresponding to the original image to be displayed while the moving picture is being played back.

The user is able to view, for five seconds for example, the original images and the corresponding frame numbers as moving pictures (slide-show-type moving picture) played back on DVD-Video playback apparatus or Video-CD playback apparatus. The user can take note of the frame numbers of still images to be printed, with print size and number of prints specified on this note. Then the user can present the note to a print processing shop together with a DVD or CD medium.

This embodiment has an advantage of obtaining an image information recording medium for recording still image information with a number of pixels for computer processing as well as recording this still image information so that the image can be viewed as a slide-show-type moving picture on image playback apparatus of the DVD-Video or Video-CD system.

Second Embodiment

Figure 5:
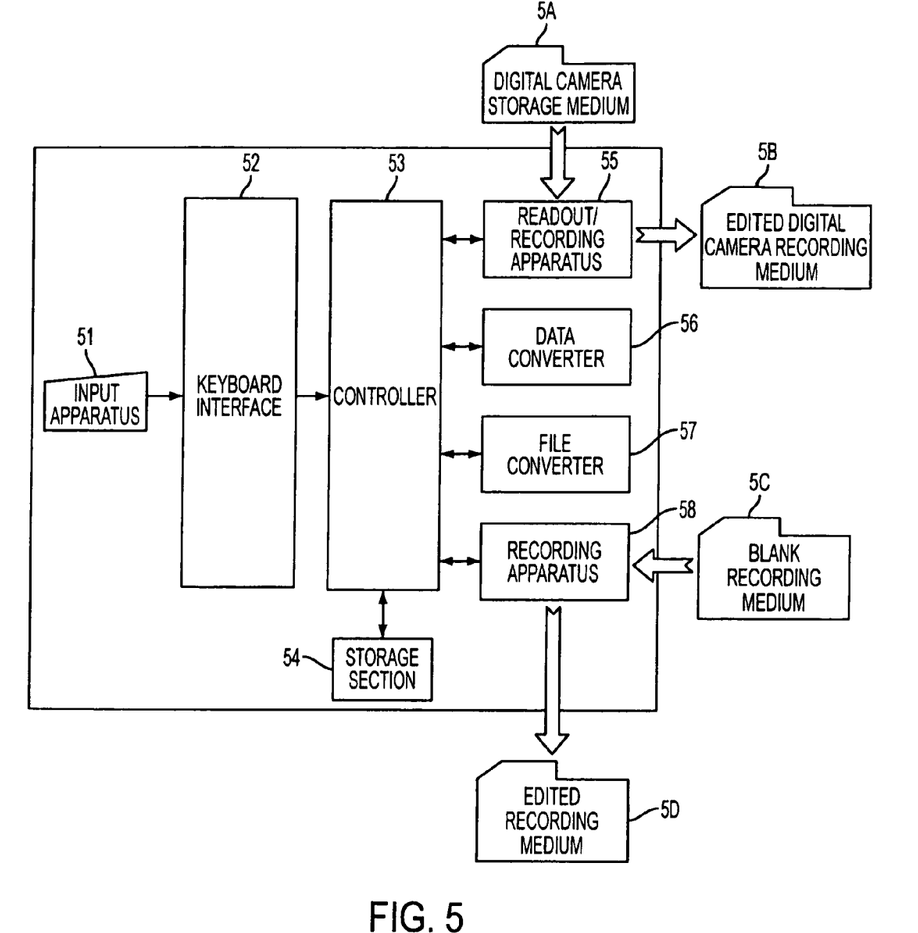
FIG. 5 is a block diagram showing the overall configuration of an image information processor according to the second embodiment of the invention.

FIG. 5 is a block diagram showing the overall configuration of an image information processor according to the second embodiment of the invention. Detailed configuration of an image information processor according to this embodiment actually differs depending on whether the destination image information recording medium is for playback of DVD-Video or Video-CD. FIG. 5 shows a block diagram of sections common to both recording media.

An image information processor according to this embodiment comprises input apparatus 51 for specifying and inputting modes, a keyboard interface 52, a controller 53 for controlling the entire system, a storage section 54 for storing control programs and data necessary for control, readout/recording apparatus 55 for reading, and rewriting if necessary, the data of a digital camera storage medium 5A, a data converter 56 for converting image data recorded on the digital camera storage medium 5A to image data (slide-show-type moving picture) for DVD-Video playback apparatus or Video-CD playback apparatus, a file editing section 57 for filing the converted image data (slide-show-type moving picture) and editing the filed image data together with image information files recorded on the digital camera storage medium 5A and outputting the edited image data, and recording apparatus 58 for recording the output from the file edit section 57 onto a blank recording medium in a format supporting playback on either a computer, DVD-Video playback apparatus or Video-CD playback apparatus as well as outputting the recorded data as an edited recording medium 5D.

Features of an image information processor according to this embodiment will be described.

An image information processor according to this embodiment creates an image information recording medium (an image information recording medium according to Embodiment 1, an edited recording medium 5D in this example) where data is recorded in a format supporting playback on either a computer, DVD-Video playback apparatus or Video-CD playback apparatus.

Features of an image information processor according to this embodiment will be described by major component.

Modes or control data can be specified and input from the input apparatus 51. The modes may include selections such as a selection on whether the file edit section 57 outputs data to a blank recording medium 5C via recording apparatus 58 or the file edit section 57 outputs data to a digital camera recording medium 5A via the readout/recording apparatus 55 and a selection on whether to use the subtitling feature and a selection on whether to use the multi-angle feature.

The control data may include data to specify how many seconds of moving picture (slide-show-type moving picture)

is to be created per frame of still image in the image data of DVD-Video playback apparatus or Video-CD playback apparatus.

The controller 53 sequentially loads and starts control programs stored in the storage section 54. These control programs are created so as to control each component as required.

The readout/recording apparatus 55 reads the image information recorded on the attached digital camera recording medium 5A. As an optional feature, output from the file edit section (output of image information for DVD-Video playback apparatus or Video-CD playback apparatus) is rewritten onto the digital camera recording medium 5A and output as a digital camera recording medium 5B.

The data converter 56 extracts image data from the image information for a computer recorded on the digital camera recording medium 5A and converts the image data to image data (slide-show-type moving picture) for DVD-Video playback apparatus or Video-CD playback apparatus. The conversion comprises data compressing means for compressing data per frame of still image, data converting means for converting the compressed data per frame to a data format supporting playback on either DVD-Video playback apparatus or Video-CD playback apparatus, data duplicating means for duplicating the converted data to as many copies of data as specified by the input apparatus 51, first data arranging means for arranging duplicated data to allow slide-show-type moving picture display, and second data arranging means for arranging data corresponding to the subtitling feature and the multi-angle feature.

The file editing section 57 adds directory information to the slide-show-type moving picture data arranged by the data converter 56 to create files as well as edits the moving data together with the files of image information recorded on the digital camera recording medium 5A, then outputs the resulting data as image information files in a format supporting playback on either a computer, DVD-Video playback apparatus or Video-CD playback apparatus.

The recording apparatus 58 records the image information output in a format supporting playback on either DVD-Video playback apparatus or Video-CD playback apparatus from the file editing section 57 on the blank recording medium 5C and outputs the image information as an edited recording medium 5D.

Figure 6:
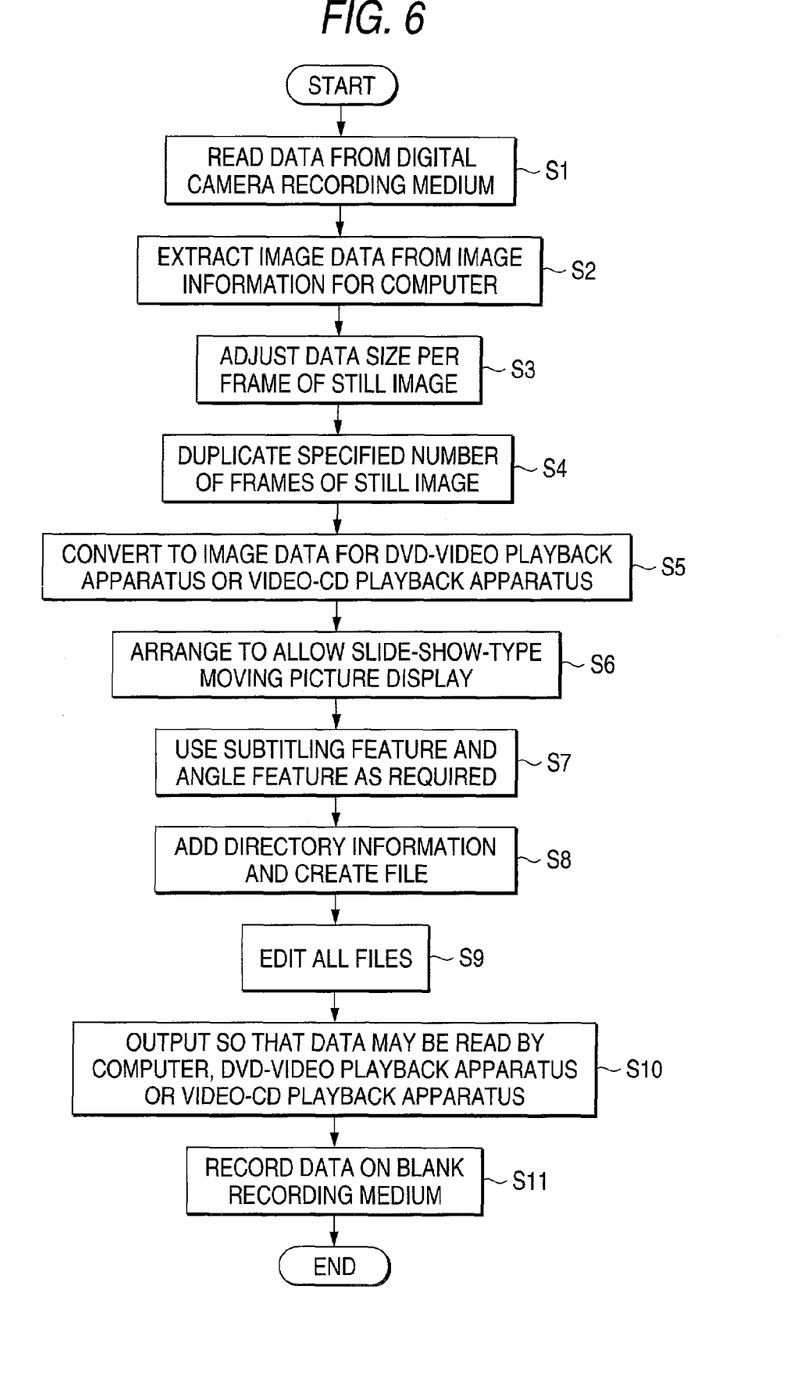
FIG. 6 is a flowchart showing the operation of an image information processor according to the second embodiment of the invention.

FIG. 6 is a flowchart showing the operation of an image information processor according to the second embodiment of the invention. Operation of an image information processor according to this embodiment will be described referring to FIG. 5 and using the flowchart of FIG. 6.

In step S1, the readout/recording apparatus 55 reads the image information record on the attached digital camera recording medium 5A. In step S2, the data converter 56 extracts image data from the image information for a computer recorded on the digital camera recording medium 5A. In step S3, the data converter 56 compresses data per frame of still image of the extracted image data for a computer. In step S4, the data converter 56 duplicates the converted data to as many copies of data as specified by the input apparatus 51. In step 5, the data converter 56 converts the compressed per-frame data to a data format supporting playback on either DVD-Video playback apparatus or Video-CD playback apparatus. In step S6, data converter 56 arranges the duplicated data to allow slide-show-type moving picture display. In step S7, the data converter 56 arranges data corresponding to the subtitling feature and the multi-angle feature.

In step S8, the file editing section 57 adds directory information to the slide-show-type moving picture data arranged by the data converter 56 to create files. In step S9, the file editing section 57 edits the moving data together with the files of image information recorded on the digital camera recording medium 5A. In step S10, the file editing section 57 outputs the resulting data as image information files in a format supporting playback on either a computer, DVD-Video playback apparatus or Video-CD playback apparatus. In step S1, the recording apparatus 58 records the image information output from the file edit section 57 onto a blank recording medium 5C in a format supporting playback on either DVD-Video playback apparatus or Video-CD playback apparatus, and outputs the recorded data as an edited recording medium 5D.

Programs for an image information processor to perform the aforementioned processing such as one to execute the processing show by the flowchart of FIG. 6 are programs according to the invention and may be distributed on a computer-readable recording medium such as a semiconductor memory, CD-ROM or a magnetic tape. Such programs may be read from the recording medium and executed by computers comprising at least microcomputers, personal computers and general-purpose computers.

This embodiment has an advantage of implementing an image information processor for recording still image information with a number of pixels which can be processed on a computer onto an image information recording medium so that the still image information may be viewed as a slide-show-type moving picture on either a computer, DVD-Video image playback apparatus or Video-CD image playback apparatus.

As mentioned earlier, according to the invention, it is possible to record still image information with a number of pixels for computer processing as well as view the still image information on image playback apparatus of the DVD-Video or Video-CD system. It is possible to provide, on a single recording medium, original image information with full information volume and image information with reduced information volume which can be played back on more general-purpose playback apparatus.

What is claimed is:

1. An image information recording medium for recording image information, comprising:
    a first image information area for recording still image information dedicated to computer processing; and
    a second image information area for recording slide-show-type moving picture data including a required number of copies of each frame of the still image information converted to a format for a video apparatus of a Video-CD system, each copy of each frame of the still image being automatically displayed for a predetermined period of time, and for recording text data for identifying the still image information, the text data indicating a correspondence of a picture of the slide-show to the still image information recorded in the first image information area and being superimposed as an image onto slide-show type moving pictures.

2. The image information recording medium according to claim 1,
    wherein, in the second image information area, slide-show-type moving picture data including a required number of copies of single-frame still image data is recorded per frame of the still image data recorded in the first image information area.

3. The image information recording medium according to claim 1,
    wherein image information for the digital video apparatus is recorded in the second image information area, the digital video apparatus being a DVD-Video system.

4. The image information recording medium according to claim 3,
wherein text data created by using a subtitling feature is recorded as well as the slide-show-type moving picture data in the second image information area.

5. The image information recording medium according to claim 3,
wherein image data created by using a multi-angle feature is recorded as well as the slide-show-type moving picture data in the second image information area.

6. The image information recording medium according to claim 1,
wherein image information for the digital video apparatus is recorded in the second image information area, the digital video apparatus being a Video-CD system.

7. The image information recording medium according to claim 6,
wherein text data is written over the slide-show-type moving picture data recorded in the second image information area.

8. An image information recording medium according to claim 4,
wherein the text data is information indicating correspondence to still image data recorded in the first image information area.

9. An image information processor for converting still image information dedicated to computer processing to image information for a plurality of pieces of digital apparatus conforming to different standards to record the resulting image information onto the same image information recording medium, the processor comprising:
a first recording unit that records still image information dedicated to computer processing in the first image information area; and
a second recording unit that records, in a second image information area, slide-show-type moving picture data including a required number of copies of each frame of the still image information converted to a format for a video apparatus of a Video-CD system, each copy of each frame of the still image being automatically displayed for a predetermined period of time and records, in the second image information area, text data for identifying the still image information, the text data indicating a correspondence of a picture of the slide-show to the still image information recorded in the first image information area and being superimposed as an image onto slide-show type moving pictures.

10. An image information processor according to claim 9, further comprising:
a third recording unit that records slide-show-type moving picture data including a required number of copies of single-frame still image data in the second image information area per frame of the still image data recorded in the first image information area.

11. The image information processor according to claim 9, further comprising:
a fourth recording unit that records image information for the digital video apparatus in the second image information area, the digital video apparatus being a DVD-Video system.

12. The image information processor according to claim 11, further comprising:
a fifth recording unit that records text data created using a subtitling feature as well as the slideshow-type moving picture data in the second image information area.

13. The image information processor according to claim 11, further comprising:
a sixth recording unit that records image data created using a multi-angle feature as well as the slideshow-type moving picture data in the second image information area.

14. The image information processor according to claim 9, further comprising:
a seventh recording unit that records image information for the digital video apparatus in the second image information area, the digital video apparatus being a Video-CD system.

15. The image information processor according to claim 14, further comprising:
an eighth recording unit that writes text data over the slide-show-type moving picture data recorded in the second image information area.

16. The image information processor according to claim 12,
wherein the text data is information indicating correspondence to still image data recorded in the first image information area.

17. A computer-readable medium storing a program that causes a computer to execute image information processing, the image information processing comprising:
recording still image information dedicated to computer processing in a first image information area; and
recording, in a second image information area, slide-show-type moving picture data including a required number of copies of each frame of the still image information converted to a format for a video apparatus of a Video-CD system, each copy of each frame of the still image being automatically displayed for a predetermined period of time, and
recording, in a second image information area, text data for identifying the still image information, the text data indicating a correspondence of a picture of the slide-show-type moving picture data to the still image information recorded in the first image information area and being superimposed as an image onto slide-show type moving pictures.

18. The computer-readable medium according to claim 17, wherein the image information processing further comprises:
causing a computer to serve as means for recording slide-show-type moving picture data comprising a required number of copies of single-frame still image data in the second image information area per frame of the still image data recorded in the first image information area.

19. The computer-readable medium according to claim 17, wherein the image information processing further comprises:
causing a computer to serve as means for recording image information for the digital video apparatus in the second image information area, the digital video apparatus being a DVD-Video system.

20. The computer-readable medium according to claim 19, wherein the image information processing further comprises:
causing a computer to serve as means for recording text data created using a subtitling feature as well as the slide-show-type moving picture data in the second image information area.

21. The computer-readable medium according to claim 19, wherein the image information processing further comprises:
causing a computer to serve as means for recording image data created using a multi-angle feature as well as the slide-show-type moving picture data in the second image information area.

22. The computer-readable medium according to claim 17, wherein the image information processing further comprises:

causing a computer to serve as means for recording image information for the digital video apparatus in the second image information area, the digital video apparatus being a Video-CD system.

23. The computer-readable medium according to claim 22, wherein the image information processing further comprises:
    causing a computer to serve as means for writing text data over the slide-show-type moving picture data recorded in the second image information area.

24. The computer-readable medium according to claim 20, wherein the text data is information indicating correspondence to still image data recorded in the first image information area.

25. The image information recording medium according to claim 10, wherein the still image data is reduced and said reduced still image data is used for recording the slide-show-type moving picture data.

26. The image information recording medium according to claim 1, wherein when only moving picture information is available, still image information is selected from the moving picture information.

27. The computer-readable medium according to claim 17, wherein when only moving picture information is available, still image information is selected from the moving picture information.

28. The image information recording medium according to claim 1, wherein still image information is selected from moving picture information without a computer.

29. The image information recording medium according to claim 1, wherein the computer processing, for the first image information area for recording still image information, allows a plurality of pieces of digital apparatus conforming to different standards access to image information.

30. The image information recording medium according to claim 1,
    wherein image information for the digital video apparatus is recorded in the second image information area, the digital video apparatus being a DVD-Video system.

31. The method of claim 1, wherein multiple copies of each still frame are displayed for the predetermined time.

32. The method of claim 31, wherein the text data superposed over the slideshow moving image being constant over the predetermined time.

33. The method of claim 32, wherein predetermined time is two seconds or longer.

* * * * *